(12) United States Patent
Fekri (10) Patent No.: US 7,349,542 B2
(45) Date of Patent: Mar. 25, 2008

(54) SYSTEMS, METHODS AND COMPUTER PROGRAM PRODUCTS FOR ENCRYPTION AND DECRYPTION USING WAVELET TRANSFORMS

(75) Inventor: Faramarz Fekri, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 839 days.

(21) Appl. No.: 10/627,156

(22) Filed: Jul. 25, 2003

(65) Prior Publication Data

US 2004/0170280 A1   Sep. 2, 2004

Related U.S. Application Data

(60) Provisional application No. 60/398,506, filed on Jul. 25, 2002.

(51) Int. Cl.
*H04L 9/00* (2006.01)
(52) U.S. Cl. .................................................. 380/263
(58) Field of Classification Search ................ 380/263, 380/269; 382/249
See application file for complete search history.

(56) References Cited

U.S. PATENT DOCUMENTS 5,680,462 A * 10/1997 Miller et al. ................ 380/263
6,216,093 B1 * 4/2001 Corron et al. ................ 702/57
6,363,153 B1 * 3/2002 Parker et al. ................ 380/263
6,600,838 B2 * 7/2003 Chui .......................... 382/249
6,898,756 B1 * 5/2005 Fekri et al. .................. 714/786
2003/0007674 A1 * 1/2003 Tsujii et al. ................. 382/132
2003/0091184 A1 * 5/2003 Chui ........................... 380/37
2003/0169940 A1 * 9/2003 Short .......................... 382/249

OTHER PUBLICATIONS

Dang et al., "Image Encryption for Secure Internet Multimedia Applications", Aug. 2000, IEEE, pp. 395-403. ☐☐*
H. Ratha et al., "Secure Data Hiding in Wavelet Compressed Fingerprint Images", 2000, ACM, pp. 127-130.*
Shien Lu et al., Structural digital Signature for Image Authentication: An Incidental distortion Resistant Scheme, 2000, ACM, pp. 115-118.*

* cited by examiner

*Primary Examiner*—Matthew B Smithers
(74) *Attorney, Agent, or Firm*—Sutherland Asbill & Brennan LLP (57) ABSTRACT

Systems and methods provide encryption and decryption using wavelet transforms over finite fields. The wavelet encryption system and wavelet decryption system include one or more filters that receive a set of wavelet coefficients as input. The wavelet coefficients are then utilized by the wavelet encryption system to cause the filters to encrypt plaintext into cyphertext. The cyphertext is then decrypted by a wavelet decryption system, which is operable to reconstruct the original plaintext using wavelet transforms that reverse the effect of the wavelet encryption system.

54 Claims, 8 Drawing Sheets

SYSTEMS, METHODS AND COMPUTER PROGRAM PRODUCTS FOR ENCRYPTION AND DECRYPTION USING WAVELET TRANSFORMS

RELATED APPLICATION DATA

The present invention claims the benefit of U.S. Provisional Patent Application Ser. No. 60/398,506, filed Jul. 25, 2002, titled "System and Method for Enabling Efficient Encryption and Decryption Using Wavelet Transforms Over Finite Fields," the contents of which are hereby incorporated by reference as if set fully herein.

FIELD OF THE INVENTION

The present invention relates generally to systems, methods and computer program products for encryption and decryption. More particularly, the invention relates to systems, methods and computer program products for encrypting and decrypting data using wavelet transforms over finite fields to ensure security of the data during transmission.

BACKGROUND OF THE INVENTION

The advancement of technology has led to an increasing demand for efficient and reliable data transmission and storage systems. This demand has led to the creation of new methods of data encryption for data storage and data transmission over physical channels.

For instance, cellular transmissions have been historically insecure and virtually anyone can intercept virtually any cellular transmission or conversation. Future mobile phones will play a pivotal role in electronic-business by delivering a range of services anywhere, and at any time. Therefore, in the event hackers could intercept such services, serious fraud could result. As a result, security technologies will be critical for building user confidence and facilitating broad market adoption of next-generation wireless e-business solutions.

Thus far, many encryption techniques have been created to reduce the likelihood of a successful communication interception. Nevertheless, virtually all encryption methods cannot prevent all interceptions. What is therefore needed are effective and reliable systems and methods for encryption and decryption.

SUMMARY OF THE INVENTION

Filter banks and wavelet transforms have established themselves as powerful tools in the analysis of signals and images when these objects are viewed as sequences over real or complex fields. The present invention extends wavelet transforms to finite fields replacing the complex field, which provides an effective method for securing communications through encryption and decryption. The present invention may also be applied to other cryptographic uses, such as signatures and authentication.

According to one embodiment of the invention, systems, methods, and computer program products provide encryption and decryption using wavelet transforms over finite fields. Specifically, the wavelet encryption system and wavelet decryption system (collectively, the "wavelet cryptosystem") include one or more filters that receive a set of wavelet coefficients as input. The wavelet coefficients are then utilized by the wavelet encryption system to cause the filters to convert plaintext into cyphertext (i.e., the encrypted version of the plaintext). The cyphertext can be decrypted by the wavelet decryption system, which is operable to reconstruct the original plaintext using wavelet transforms that reverse the effect of the wavelet encryption system. Like the encryption, the decryption of the cyphertext depends on wavelet coefficients which permit the decryption system to cause filters to transform the cyphertext into the plaintext.

It will be appreciated that the abovementioned coefficients are derived by utilizing a series of mathematical relational equations. More specifically, the present invention provides for a general wavelet decomposition of sequences defined over finite fields. The performance of mathematical operations and supplying of filter coefficients for filters implementing encoding and decoding within the cryptosystem of the present invention may be accomplished by utilizing hardware, software, firmware, or a combination thereof.

According to the present invention, two methods of generating filter coefficients are provided, thus creating two separate methods for generating the shared key used by the transmitting device and receiving device for encrypting and decrypting a communication transmitted over a communications medium.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be appreciated that the systems and methods of the present invention are described below with reference to block diagrams and flowchart illustrations. It should be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a mechanism, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the functions specified herein. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
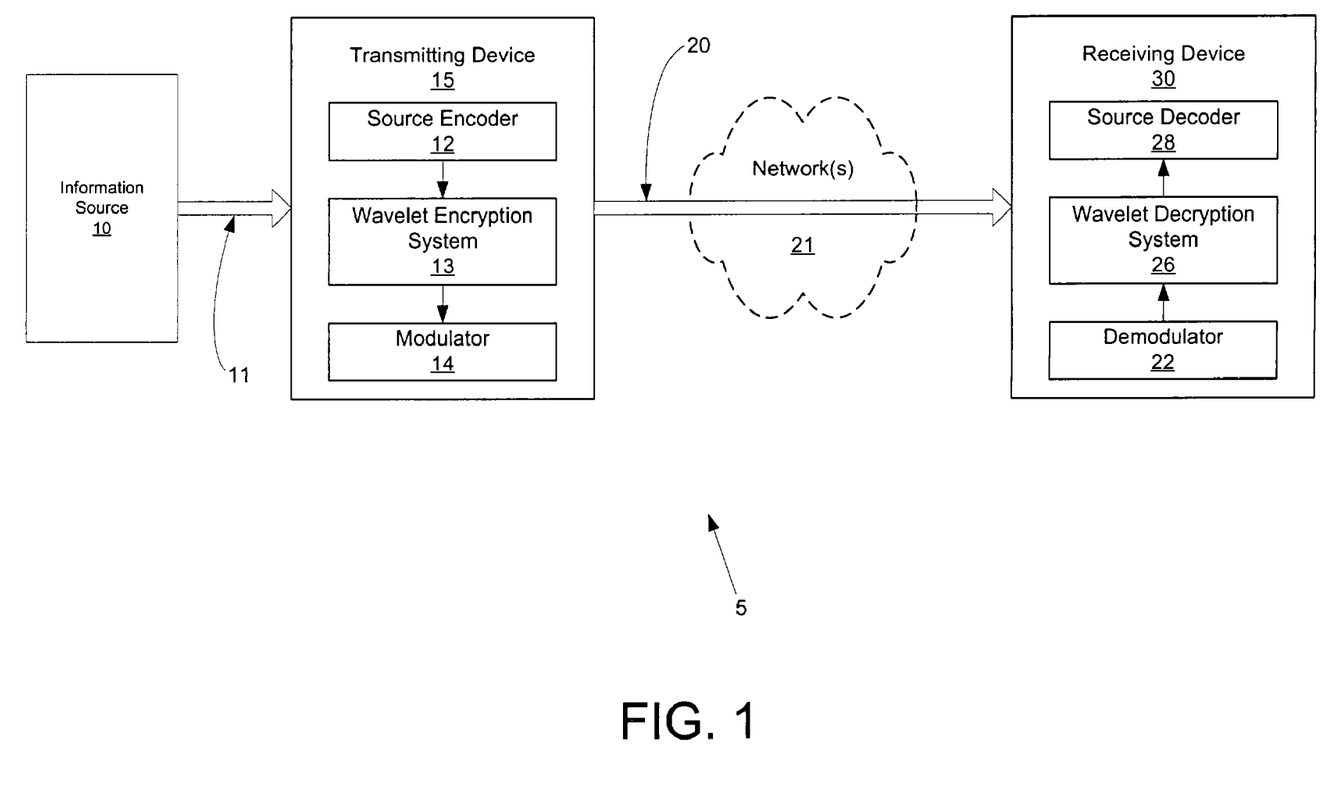
FIG. 1 shows a block diagram system of the present invention, according to one embodiment of the present invention.

Referring now to FIG. 1, the system 5 of the present invention includes an information source 10, which may be a person, or a machine such as a computer, that outputs message data 11 to be communicated to a receiving device 30 by a transmitting device 15 in communication therewith. The transmitting device 15 and receiving device 30 are in communication via a communication medium 20. The devices 15, 30 may comprise wireless devices, such as mobile phones or personal digital assistants (PDAs), or wired devices such as telephones or computers. The communication medium 20 include one or more communication pathways, and may include one or more networks 21, such as wireless networks, public switch telephone offices, the Internet, microwave links, satellite links, and high-frequency radio links or similar networks or network devices for facilitating the communication between the two devices 15, 30.

To effect the communication from the information source 10 to the receiving device 30, the message data 11 is transmitted by the information source 10 to the transmission device 15, which is in communication therewith. More particularly, the message data 11 is transmitted to the source encoder 12 within the transmission device 15. The message data 11 may be either a continuous waveform, e.g., analog speech, or a sequence of discrete symbols. Upon receiving the message data 11, the source encoder 12 transforms the message data 11 into a sequence of binary digits referred to as an plaintext, as is known to one of reasonable skill in the art. The plaintext is in a finite field, and may include a relatively small field such that the sequence is 1s and 0s, or a larger field such that the sequence includes numbers between 0 and 255.

After its transformation into an plaintext, the plaintext is encrypted by the wavelet encryption system 13, which is in communication with the source encoder 12. The encrypted plaintext is referred to hereinafter as cyphertext. The wavelet encryption system 13 encrypts the plaintext to ensure that it remains secure during its transmission to the receiving device 30. The wavelet encryption system 13 may also include and/or operate as a channel encoder such that the cyphertext is transformed into a discrete encoded sequence, or a code word. Because discrete symbols may not be suitable for transmission over a communication channel 20, the code word may first be transmitted to a modulator 14 that transforms each output symbol into a waveform which is suitable for transmission over the communication channel 20. Although the cyphertext transmitted from the transmitting device 15 to the receiving device 30 may include modulated cyphertext, due to its modulation by the modulator 14, the present invention will be described with reference hereafter to cyphertext.

According to one aspect of the present invention, although the source encoder 12, wavelet encryption system 13 and modulator 14 are illustrated as separate components within the transmitting device 15, it will be appreciated that the components may be combined. For example, according to one aspect of the present invention, the source encoder 12 and modulator 14 may be included within the wavelet encryption system 13. According to another aspect of the present invention, one or more of the components 12, 13, 14 may also be in remote communication with the transmitting device 15 such that each component 12, 13, 14 need not reside within the device 15. For example, the source encoder 12 may reside within the information source 10. Additionally, as mentioned above, each of the components 12, 13, 14 may be implemented by hardware, software, or a combination thereof. According to a preferred embodiment of the present invention, the components 12, 13, 14 are implemented using a single digital signal processing chip located within the transmitting device.

After the cyphertext (which, as noted above may include modulated cyphertext) is transmitted across the communication channel 20, the cyphertext may be processed by a demodulator 22 capable of producing a discrete or continuous output. Because the cyphertext sequence resulting from the demodulation may contain errors introduced by the physical channel (or storage medium) 20 one or more methods known to those of skill in the art may be used to reduce or eliminate such errors. The cyphertext outputted by the demodulator 22 is then transmitted to the wavelet decryption system 26, which is operable to reconstruct the plaintext from the received cyphertext. According to one aspect of the present invention, the wavelet decryption system 26 may include a channel decoder located therein to collect errors and reconstruct the original plaintext. After decryption, the plaintext may be transmitted to a source decoder 28 which reverses the effects of the source encoder 12 by transforming the plaintext into the message data 11 transmitted by the information source 10. According to a preferred embodiment of the present invention, the components 22, 26, 28 are implemented using a single digital signal processing chip located within the receiving device 30.

According to one embodiment of the present invention, systems and methods of the present invention provide encryption and decryption using wavelet transforms over finite fields. Specifically, the wavelet encryption system 13 includes one or more filters that receives as input a set of wavelet coefficients. The wavelet coefficients are then utilized by the wavelet encryption system 13 to cause the filters to transform an plaintext into an cyphertext. The cyphertext is then decrypted by the wavelet decryption system 26, which is operable to reconstruct the original message data using inverse wavelet transforms that reverse the effect of the encryption system 13. Like the encryption, the decryption of the encrypted sequence depends on wavelet coefficients which permit the decryption system 26 to cause filters to transform the cyphertext into plaintext, which may be decoded to produce the original message data 11.

It will be appreciated that the abovementioned wavelets are derived by utilizing a series of mathematical relational equations. More specifically, the present invention provides for a general wavelet decomposition of sequences defined over finite fields. The performance of mathematical operations and supplying of filter coefficients for the encoding and decoding filters within the wavelet encryption and decryption systems 13, 26 of the present invention may be accomplished by utilizing hardware, software, firmware, or a combination thereof. Therefore, according to one aspect of the present invention, the coefficients are calculated by hardware and/or software operating on the transmitting device. The function of the wavelets and their significance in the systems and methods of the present invention are considered in detail with respect to FIGS. 2-8.

It should be appreciated that throughout the embodiments of the invention described herein all arithmetic is carried out in a specific finite field, $GF(p^r)$, where GF denotes a Galois field, p is a prime number and r relates to the type of finite field represented. As an example, if the desired field of use is the binary field, the specific finite field will be GF(2). In such an embodiment the wavelet encryption system 13 receives a series of 1s and 0s which are encrypted using wavelets. Furthermore, the description of the embodiments of the invention concerning the wavelet encryption system 13 and wavelet decryption system 26 are described with reference to block cipher or stream cipher, as will be appreciated by those of skill in the art. Briefly, block cipher may encrypt individual blocks of bits to be transmitted by the transmitting device 15 to the receiving device 30, whereas stream cipher will encrypt the entire stream of bits.

Figure 2:
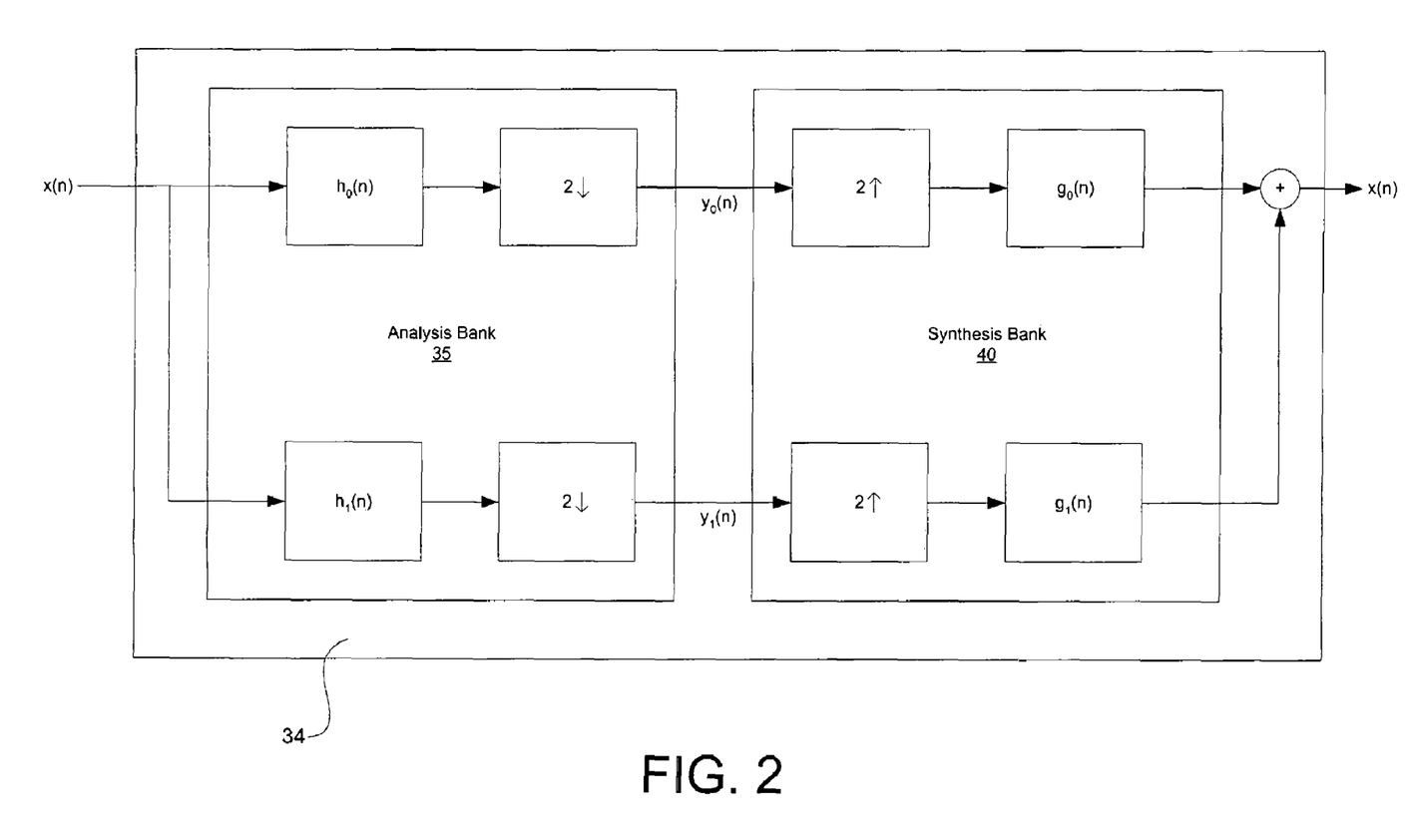
FIG. 2 shows an analysis bank and synthesis bank for effecting encryption and decryption, according to one embodiment of the present invention.

Next, as is shown in FIG. 2, the wavelet cryptosystem of the present invention may be implemented using an L-band analysis-synthesis filter bank 34. For simplicity, the cryptosystem of the present invention is described using a two-band wavelet. In particular, FIG. 2 shows analysis and synthesis banks 35, 40 of a two-channel perfect reconstruction filter bank 34 in which the synthesis filters $g_0(n)$ and $g_1(n)$ are the scaling sequence and mother wavelet of lengths (2N+2), respectively.

According to one aspect of the invention, the analysis bank 35 performs the wavelet transform and the synthesis bank 40 performs the inverse wavelet transform. Therefore, the filter bank 34 represent filters operable to encrypt plaintext and to decrypt cyphertext using waveform and inverse waveform transforms. According to a preferred embodiment of the present invention, the wavelet transform is used for decryption and the inverse wavelet transform is used for encryption. This embodiment will be used hereinafter to describe the systems and methods of the present invention. However, according to another aspect of the invention, the wavelet transform may be used for encryption and the inverse wavelet transform may be used for decryption.

The analysis bank 35 performs the wavelet transform and the synthesis bank 40 performs the inverse wavelet transform. The boxes labeled $h_0(n)$, $h_1(n)$, $g_0(n)$, and $g_1(n)$ are digital filters (in the finite field) that perform convolution. The blocks labeled $\downarrow 2$ downsample the input plaintext x(n) by a factor of two by taking every other sample, and those labeled $\uparrow 2$ increase the sampling rate by a factor of two by inserting one sample with value zero between each pair of samples of its input.

The sequences labeled $y_0(n)$, $y_1(n)$ are the wavelet coefficients. It will be appreciated that the impulse responses of the digital filters $h_0(n)$, $h_1(n)$, $g_0(n)$, and $g_1(n)$ must be related if the synthesis bank 40 is to invert the results of the analysis bank 35. This relation is specified by the wavelet basis functions. It will be appreciated by those of ordinary skill in the art that the analysis filters are derived from the synthesis filters using:

$$h_j((n))_{2N+2} = g_j((-n))_{2N+2} \; j=0,1 \; n=0, \ldots, 2N+1,$$

where $(( \;))_{2N+2}$ denotes a circular convolution of length (2N +2). The above relation is accurate for a block cipher where the convolution is cyclic. For the stream cipher case the relation is given by $$h_j(n) = g_j(2N+2-n) \; j=0,1 \; n=0, \ldots, 2N+2.$$

Additionally, for both stream cipher and block cipher $g_1(n) = g_0(2N+1-n)$ where $n=0,1, \ldots, 2N+1$.

The basic operation of the filters $h_0(n)$, $h_1(n)$, $g_0(n)$, and $g_1(n)$ in FIG. 2 is convolution, i.e, a sum of products, in which the multiplications and additions are performed in the appropriate field. For certain applications, such as implementing block ciphers, the convolutions may be cyclic (or in signal processing terminology circular or periodic) and for others, such as stream cipher, they may be noncyclic (or ordinary linear) convolutions.

Generally stated, it is complex to find filter pairs of FIG. 2 that satisfy the perfect reconstruction property (i.e., where the synthesis bank 40 inverts the results of the analysis bank 35) in a finite field. For a given length 2N+2, there might exist several solutions having different properties. As explained in detail hereinafter, the present invention provides two different methods for calculating the filter coefficients that can be used to generate filters used in the wavelet encryption and decryption systems 13, 26 of the present invention to encrypt and decrypt data.

It will be appreciated that without the derivation of appropriate filter coefficients to perform the encryption and decryption, cyphertext will not be able to be reconstructed by the wavelet decryption system 26 because the filter coefficients represent a shared key used by the transmitting device and the receiving device to encrypt plaintext and decrypt cyphertext.

Filter Derivation Method One

Figure 3A:
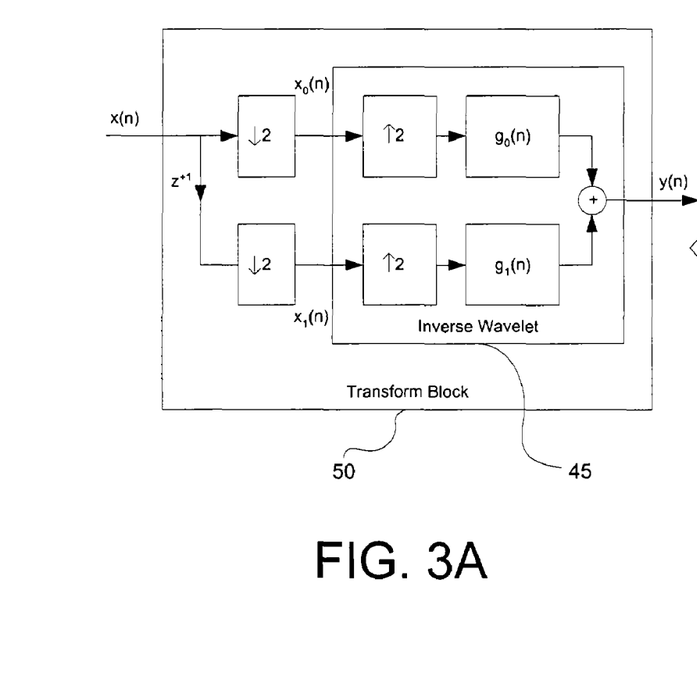
FIG. 3A shows an elementary transform block used for encryption, according to one embodiment of the present invention.

According to one aspect of the present invention, to derive the filter coefficients $g_0(n)$, $g_1(n)$, $h_0(n)$ and $h_1(n)$ the relational equation $x(n)=\Sigma<\theta_k(n)$, $x(n)>\theta_k(n)$ is used, where $\theta_k(n)$ represents a basis function, and the inner product of $<\theta_k(n), x(n)>$ is used to derive the wavelet coefficients of the basis function. The inverse wavelet representation of this relational equation, with relation to FIG. 2, namely $$c(n) = \sum_{j \in z} \langle g_0(n-2j), c(n) \rangle g_0(n-2j) + \sum_{j \in z} \langle g_1(n-2j), c(n) \rangle g_1(n-2j)$$

is then taken, wherein the two functions $g_0(n)$ and $g_1(n)$ relate to the scaling function and mother wavelet respectively. In this equation, the inner product of $<g_0(n-2j), c(n)>$ is representative of the wavelet coefficient $x_0(n)$ of FIG. 3, considered further below, and the inner product of $<g_1(n-2j), c(n)>$ is representative of the wavelet coefficient $x_1(n)$ of FIG. 3. Therefore, $c(n)$ can be represented by the equation:

$$c(n) = \sum_{j \in z} x_0(j) g_0(n-2j) + \sum_{j \in z} x_1(j) g_1(n-2j).$$

To solve for $g_0(n)$ and $g_1(n)$ the equation $A(z)A^c(z)+B(z)B^c(z)=Z^M$ is solved, wherein the solutions $A(z)$ and $B(z)$ are related to the values of the filter coefficients. The filter coefficients relating to the wavelet encryption system 13 of FIG. 1 are $g_0(n)$ and $g_1(n)$, with the z transforms of these coefficients being $G_0(z)$ and $G_1(z)$ respectively. Thus, each of the filter coefficients of the wavelet encryption system 13 and the wavelet decryption system 26 are related.

In fields with characteristic 2, M is an arbitrarily chosen even number less than or equal to N. Then above equation can be written as:

$$\{A(z)+z^{M/2}\}\{A(z)+z^{M/2}\}^c = B(z)B^c(z)$$

provided that $A(z)$ is a symmetric polynomial, $A(z)=A^c(z)$. Therefore, in this example, any $B(z)$ equal to $A(z)+z^{M/2}$ is also a symmetric polynomial. In summary, if M is an even number, the polynomial pair $A(z)$ and $A(z)+z^{M/2}$ is a solution to $A(z)A^C(z)+B(z)B^C(z)=z^M$ over $GF(2^r)$, where $A(z)$ is any arbitrary symmetric polynomial of degree M with a nonzero constant coefficient.

Based on the above, it will be appreciated that the polyphase components of $G_0(n)$ may be computed:

$$E_{00}(2)=A(z); \text{ and}$$

$$E_{01}(z)=A(z)+z^{(M/2)}$$

Using these polyphase components, $G_0(n)$ may be constructed using the equation $G_0(z)=E_{00}(z^2)+z^{-1}E_{01}(z^2)$. Because $G_0$ has been solved according to the abovementioned equations, coefficients $g_0(n)$, $g_1(n)$, $h_0(n)$ and $h_1(n)$ may be solved and the filters for the wavelet encryption system 13 and wavelet decryption system 26 matched, as will be appreciated by those of ordinary skill in the art. As noted above, the above calculations may be implemented by hardware and/or software, and may be implemented, for instance, using a digital signal processing chip on the transmitting device 15 and/or receiving device 30.

Filter Derivation Method Two

The first filter coefficient derivation method described above employs symmetric polyphase filters to construct filter banks used in encrypting and decrypting plaintext and cyphertext, respectfully. This symmetry is very useful property to simplify the polyphase implementation of the filter banks and to reduce the number of additions and multiplications that are required by a wavelet cryptosystem according to the present invention. However, the symmetric structure of the polyphase filters may reduce the strength of the security of the cryptosystem when it is used in a stream cipher mode. Therefore, as an alternative to the first method for deriving filters used in the cryptosystem, systems and methods of the present invention may alternatively utilize a second method that eliminates this security concern at the cost of slightly higher computational complexity.

It first should be appreciated that every filter bank has a polyphase matrix representation. To generate filters using the second method for filter derivation, types of building blocks, $D(z)$ and $S(z)$, are assumed to be necessary and sufficient building blocks to construct two-band filter banks, where $D_v(z)$ is the degree-one PU building block defined by:

$$D(z)=d(0)+z^{-1}d(1)=I+l_v^{-1}vv^T+z^{-1}l_v^{-1}vv^T, \text{ where:}$$
$$lv=v^T v \neq 0.$$

It should also be appreciated that for two-band filter banks $v=[a\ b]^T$ is a vector of length two in $GF(2^r)$ and $l_v$ is always square. The nonzero condition of $l_v$ requires that $a \neq b$. A degree $2\tau$ elementary building block has the following structure:

$$S_{\tau\zeta}(z)=\zeta(I+J)+z^{-\tau}I+z^{-2\tau}\zeta(I+J),$$

where $\zeta \neq 0$ is a scalar in $GF(2^r)$ and $\tau$ is any positive integer. Here, I and J are the identity and exchange matrices, respectively. Thus, $$I+J = \begin{pmatrix} 1 & 1 \\ 1 & 1 \end{pmatrix}.$$

Using the second filter bank derivation method, to construct filter banks of a certain length several degree one and degree $2\tau$ building blocks may be cascaded, where the order of the building blocks is arbitrary but where at least one degree one building block is placed between each pair of degree $2\tau$ building blocks. The product of these building blocks results in a two by two polyphase matrix:

$$E(z) = \begin{bmatrix} E_{00}(z) & E_{01}(z) \\ E_{10}(z) & E_{11}(z) \end{bmatrix}.$$

Having $E_{00}(z)$ and $E_{01}(z)$, $G_0(z)$ may be computed using the equation $G_0(z)=E_{00}(z^2)+z^{-1}E_{01}(z^2)$. Similarly, $G_1(z)$ may be computed using the equation $G_1(z)=E_{10}(z^2)+z^{-1}E_{11}(z^2)$. The filters of the synthesis bank $h_0(n)$ and $h_1(n)$ are then generated from $H_0(n)$ and $H_1(n)$ as described above.

Next, the implementation of the wavelet encryption system 13 and wavelet decryption system 26 are discussed with respect to FIGS. 3-8. First, it should be appreciated that in a public key encryption system, user A sends an invoice to user B, encrypting it via its secret key and user B's public key. The recipient (user B) then uses his or her private key and user A's public key to decrypt the transmitted document.

One of the interesting properties of the finite-field wavelet is that it transforms the input data to a sequence similar to white noise. More precisely, finite-field wavelets have a decorrelating property. Therefore, the encryption provided by the present invention is extremely difficult to decrypt or otherwise reconstruct.

In addition to this decorrelating property of the finite-field wavelets, there are two more key properties that the present invention exploits to construct a public key encryption system. First, a high degree of non-linearity can be introduced by using nonlinear finite-field wavelets. Secondly, nonlinear wavelets have a unique structure that can be exploited to construct a public key encryption system with a very large key space.

As discussed above, according to one preferred embodiment of the present invention encryption and decryption are performed by the synthesis and analysis banks, respectively, of the nonlinear finite-field wavelet transform. The cryptosystem is determined by the secret and public keys of the users. Thus, security is tied to the length of the wavelet basis function and to the nonlinearity within the wavelet transform.

According to a preferred embodiment of the present invention, systems of the present invention utilize wavelets that operate over GF(256) and a nonlinear device that performs a mapping of field elements to their inverse in the field. Therefore, cracking a cryptosystem of the present invention using a chosen-ciphertext attack (in which the enemy is able to acquire an arbitrary number of corresponding cipher and message pairs of his own choice) is equivalent to solving a set of nonlinear equations over finite fields. Additionally, as described above it should be appreciated that the resulting cryptosystem can operate in either stream-cipher or block-cipher modes depending on whether the filter banks perform linear or circular convolution.

Figure 3B:
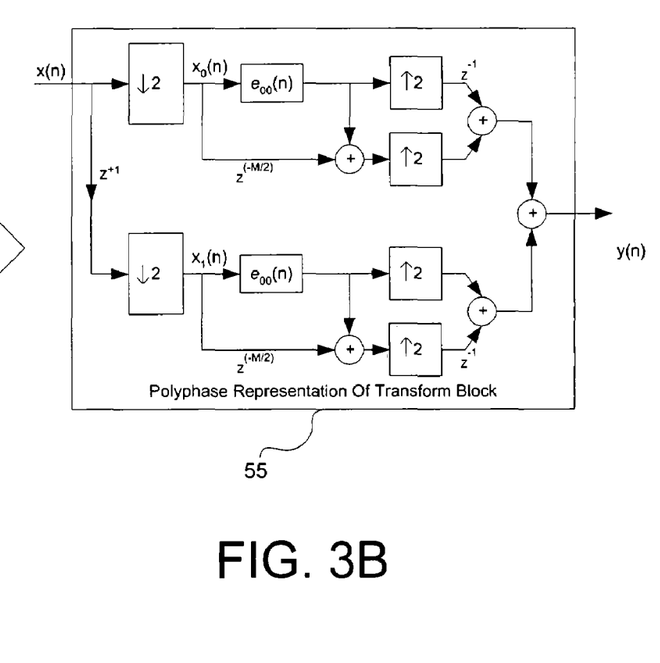
FIG. 3B shows a polyphase representation of the elementary transform block of FIG. 3A, according to one embodiment of the present invention.
Figure 4A:
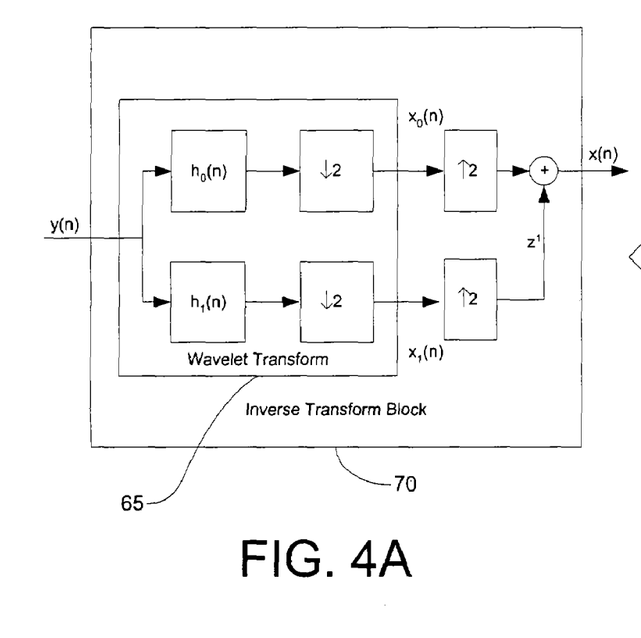
FIG. 4A shows an elementary inverse transform block used for decryption, according to one embodiment of the present invention.
Figure 4B:
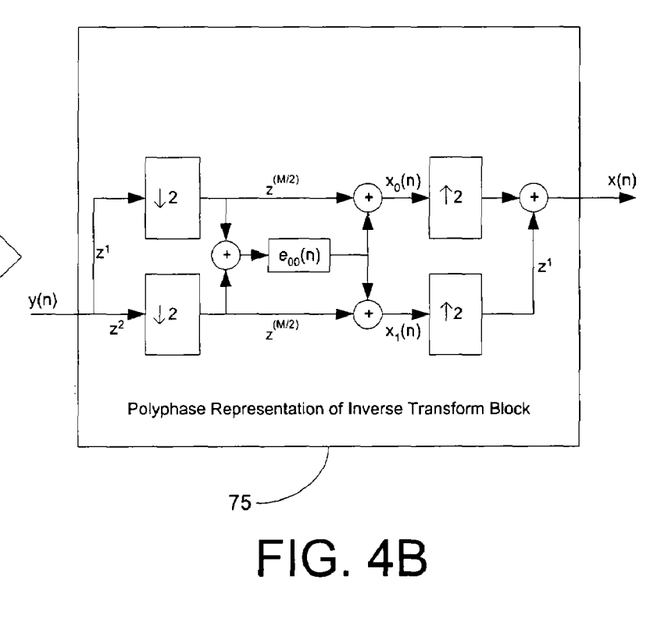
FIG. 4B shows a polyphase representation of the elementary inverse transform block of FIG. 4A, according to one embodiment of the present invention.

As stated above, the present invention utilizes the inverse wavelet transform for the encryption of the message and the wavelet transform for the decryption. FIG. 3A shows an elementary transform block 45 that is used for encryption. According to one aspect of the present invention, the elementary transform block 45 may be implemented by the wavelet encryption system 13. It should be noted that the polyphase representation of the two-band filter banks (that are actually used in the implementation of the cryptosystem of the present invention) given by FIGS. 3 and 4, are only valid if the first method of generating filter banks is used. Thus, the general well known polyphase representation introduced for real/complex fields should be used in case the system of the present invention employs the second method. Unlike the first filter derivation method, in this case, the polyphase representation is the same for both the finite field and real/complex field.

As illustrated in FIG. 3A, this elementary transform block 50 utilizes the inverse wavelet transform 45 together with a demultiplexer that splits the input signal x(n) (e.g., plaintext) into even index $x_0(n)$ and odd index $x_1(n)$ sequences. If the first method for deriving the filter coefficients is used, the symmetric property of the polyphase filters may be exploited as noted above. The polyphase representation of multirate filters, as is known in the art, may be used to further simplify the structure of the transform block into FIG. 3B. In this polyphase representation 55, $e_{oo}(n)$ is the even index polyphase components of the filter $g_0(n)$. Using the first method for deriving the filter coefficients, and the assumptions used in the first method, the polyphase filter $e_{oo}(n)$ can be any symmetric sequence of length M+1, where M is an even number that is determined by the key length in the cryptosystem, where the number of keys is M/2+1. This simplification reduces the number of operations by a factor of two because the length of the polyphase filter $e_{oo}(n)$ is half of the length of the filter $g_0(n)$. The transform block maps the sequence x(n) by a one-to-one mapping to the sequence y(n).

The mapping that is performed by the transform block (TB) 50 is a linear and invertible transformation. By the property of the wavelet system, x(n) (e.g., plaintext) can be extracted from y(n) (e.g., cyphertext) by using the inverse transform block 70 shown in FIG. 4A. The inverse transform block consists of the wavelet transform 65 associated with the inverse wavelet transform in the encryption block and a multiplexer that interleaves and combines the even and odd indexes to obtain x(n). Similar to the transform block, the inverse transform block 70 defined over the field $GF(2^r)$ may be simplified as shown in FIG. 4B by the symmetric polyphase representation 75 having component $e_{oo}(n)$ of the filter $g_0(n)$. In summary, FIGS. 3B and 4B as the basic blocks for encryption and decryption, respectively. Therefore, the respective polyphase representations may be implemented by the wavelet encryption system 13 and wavelet decryption system 26, respectively, of FIG. 1. It will also be appreciated with reference to FIGS. 3A, 3B, 4A and 4B that to determine the implementation of the encryption and decryption blocks, any arbitrary symmetric sequence $e_{oo}(n)$ of length M+1 may be chosen, where M is any even number.

In practical application, the cryptosystem of the present invention is set up such that both the transmitting device 15 and the receiving device 30 have the same filters. Next, two methods of effecting encryption and decryption based on the two methods of filter generations described earlier will be discussed. As will be explained in greater detail below, a 128 bit key encryption results where the same 128 bit key (16 8-bit symbols in GF(256)) is generated twice. This may be implemented by consecutive 64 bit encryption filters. After the consecutive 64-bit encryption filters produce a 128 bit key, coefficients of a second encryption round can be obtained by the permutation of the 16 symbols, as is well known in the art, to effect 256 bit encryption.

Key Generation Method One

The first method of filter generation is preferably used for the block cipher mode of the wavelet system. As noted above, to provide for encryption and decryption a symmetric sequence eoo(n) must be generated in a secure way and provided to the transmitter and the receiver. To effect this the security of the discrete log problem (DLP) over finite fields is exploited as described hereafter.

According to one aspect of the present invention, the transmitting device 15 and the receiving device 30 may each choose independently a symmetric sequence of length M+1 as their secret key, where M is an even positive integer. For illustrative purposes, let the symmetric sequence $\{k_0, \ldots, k_M\}$ be the secret key of the transmitting device 15. Additionally, let the symmetric sequence $\{\gamma_O, \ldots, \gamma_M\}$ be the secret key of the receiving device 30. Because the key is a symmetric sequence, the effective key length is M/2+1. The transmitting device 15 generates the public sequence by using the discrete log function over a cyclic group $Z_p^*$, where p is a large prime and it is such that the DLP is intractable over $Z_p^*$. In other words, the transmitting device's 15 public sequence is the sequence $\{v_O, \ldots, v_M\}$ where $v_i = \alpha^{k_i}$ mod P. Here, $\alpha$ is the generator of the cyclic group $Z_p^*$. Since $k_i$ are symmetric, the public key sequence $\{v_O, \ldots, v_M\}$ is symmetric as well. Similarly, the receiving device 30 generates its public key sequence $\{\beta_O, \ldots, \beta_M\}$ by using $\beta_i = \alpha^{\gamma_i}$ mod P. If the transmitting device wishes to send a message to the receiving device, the transmitting device generates a symmetric sequence by computing $\beta_i^{k_i}$ mod P which is equal to $\alpha^{\gamma_i k_i}$ mod P for i=0, . . . ,M. This is a symmetric sequence that is used by the transmitting device 15 as the coefficient of the polyphase filter $e_{00}(n)$ in the encryption elementary block shown in FIG. 3B. Likewise, the receiving device 30 can compute its polyphase filter coefficients by combining the public key of the transmitting device with its secret key by using $v_i^{\gamma_i}$ mod P which is equal to $\alpha^{\gamma_i k_i}$ mod P for i=0, . . . ,M. The receiving device uses the resulting symmetric sequence as the coefficient of the polyphase filter $e_{00}(n)$ in the decryption elementary block shown in FIG. 4B. This polyphase filter is the same as the polyphase filter that is used by the transmitting device 15. Therefore, the receiving device 30 can decrypt the ciphertext transmitted by the transmitting device 15. A third party cannot easily decrypt the message because it has to solve the discrete log problem in order to access the receiving device's 30 secret key.

Key Generation Method Two

The second method of filter generation, described in detail above, is preferred where a stream cipher mode of the wavelet system is used. Although this method can also be used for the block cipher method, it is not preferred for block cipher because it increases the computational complexity of the encryption and decryption. To generate 16 symbols key that are shared by the transmitter and receiver, a discrete log problem (DLP) may be used to implement the key exchange, as is well known in the art. Next, the generation of the polyphase filters will be explained (i.e., after the 16 key coefficients are determined by the DLP method in the devices 15, 30).

Where a first round consists of two sets of two-band filter banks, each filter bank uses 8 coefficients. This means that a polyphase matrix should have the following form $E(z)=D_{v1}(z)S_{2,\zeta_1}(z)D_{v2}(z)S_{2\zeta_2}(z)D_{v3}(z)$ where the scalars $\zeta_1, \zeta_2$ and the vectors $v_1, v_2, v_3$ satisfy the criterion described above. Each vector v is specified by two key coefficients and each $\zeta$ is determined by one key coefficients. Therefore, the total key usage to specify the polyphase matrix is 8. By this description, the lengths of the polyphase filters are equal to 8 as oppose to the previously described key generation method in which length 15 polyphase filters are required for each two-band filter banks.

Structure Of The Wavelet Encryption And Decryption Systems

Figure 5A:
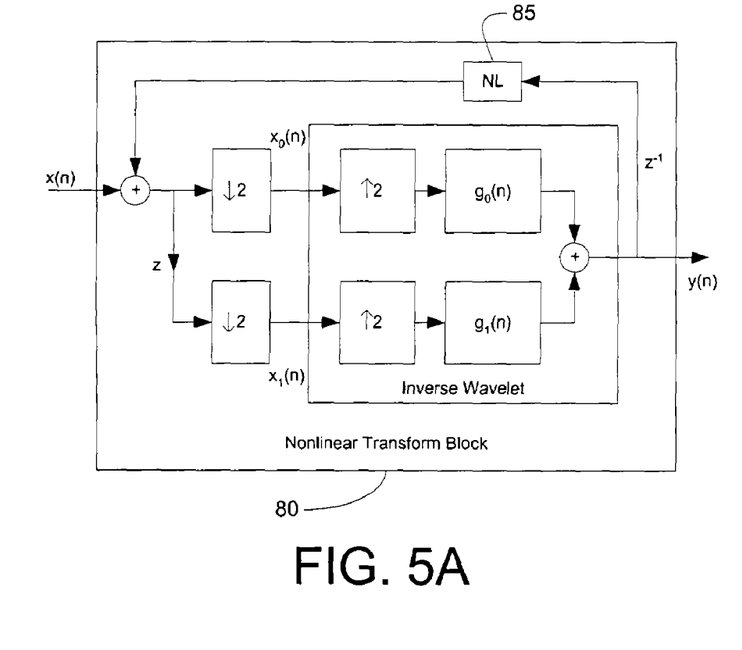
FIG. 5A shows an elementary nonlinear transform block used for the encryption, according to one embodiment of the present invention.
Figure 5B:
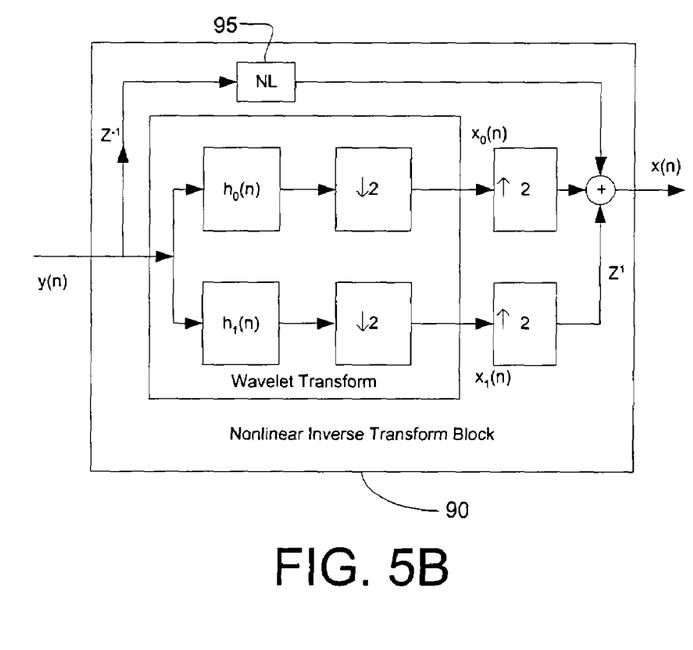
FIG. 5B shows an elementary nonlinear inverse transform block used for the decryption, according to one embodiment of the present invention.

According to a preferred embodiment of the present invention, the encryption and decryption systems 15, 30 of the present invention introduce nonlinearity to the wavelet transforms used to encrypt and decrypt information transmitted across the communication channel. Therefore, according to one aspect of the present invention, a nonlinear wavelet may be utilized in order to make the system resistant against security attacks. FIG. 5A shows an elementary nonlinear transform block 30 used for the encryption, according to one embodiment of the present invention. FIG. 5B shows an elementary nonlinear inverse transform block 90 used for the decryption, according to one embodiment of the present invention.

As shown in FIG. 5A, nonlinearity in the transform block is introduced by taking the output y(n) of the wavelet system and passing it through a nonlinear operation 85 and adding the result to the incoming plaintext x(n). The nonlinear operation 85 may be introduced by either raising the primitive element of the field GF(256) to the power of y(n−1) or by mapping of y(n−1) to its inverse in GF(256). Although either operations may be used, the mapping of y(n−1) to its inverse in GF(256) is used hereinafter as the nonlinear operation for purposes of illustration. Note that if the input y(n−1) is a zero number it may be mapped to zero because a zero element does not have any inverse in GF(256). The nonlinear inverse transform block 90 associated with the nonlinear transform block 80 is illustrated by FIG. 5B, which also includes a nonlinear operation 95. This nonlinear operation 95 is the same as the nonlinear operation 85 illustrated in FIG. 5A.

Figure 6A:
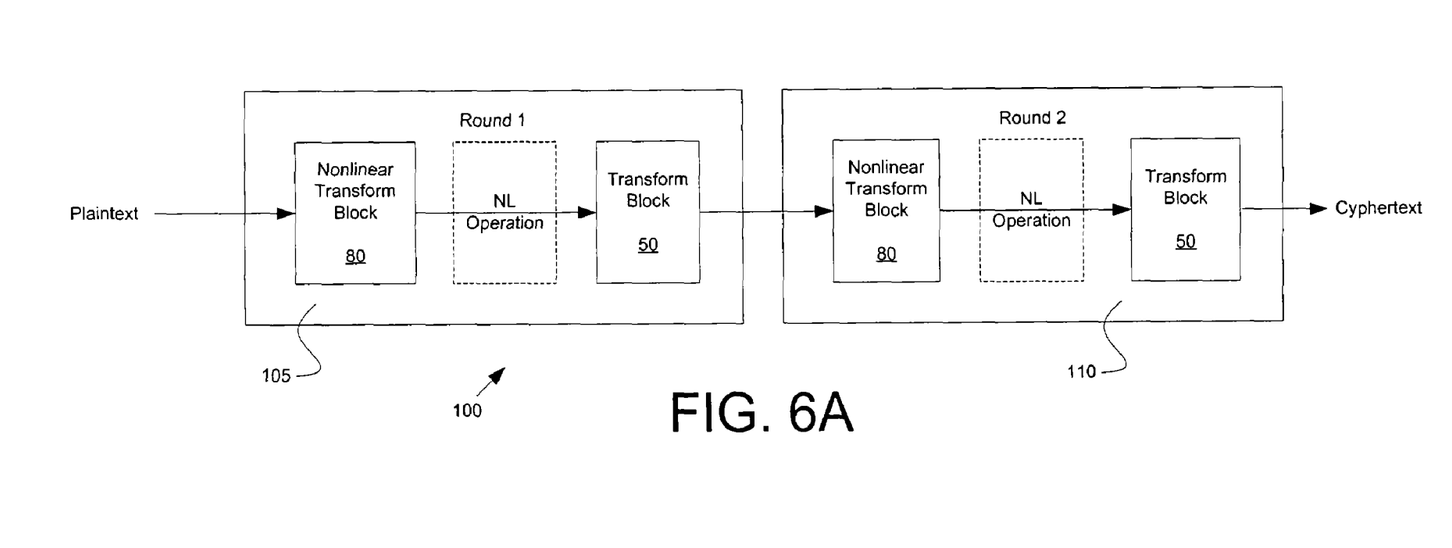
FIG. 6A shows the wavelet encryption system according to one embodiment of the present invention.
Figure 6B:
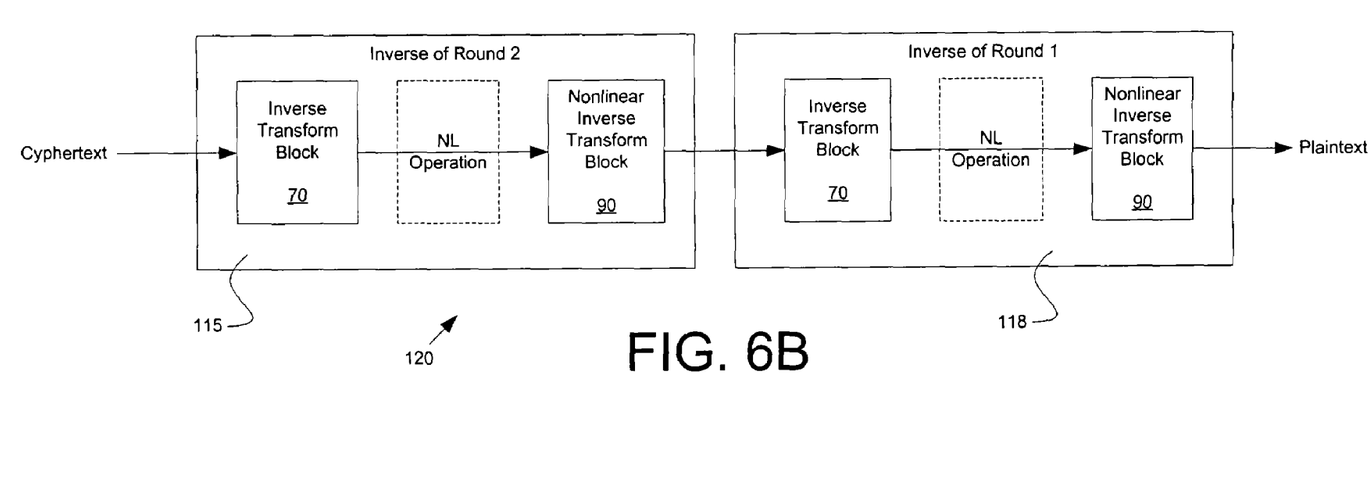
FIG. 6B shows the wavelet decryption system according to one embodiment of the present invention.

An overall proposed wavelet encryption system 100 implementing such nonlinearity is illustrated in FIG. 6A, and an overall proposed wavelet decryption system 120 is illustrated in FIG. 6B. As shown in the embodiment illustrated in FIG. 6A, the wavelet encryption system 100 consists of two rounds 105, 110. As explained in greater detail hereinafter, the two rounds 105, 110 of the wavelet encryption system 100 may result in the total key size of 128 bits. It will be appreciated that the number of rounds may also be increased to reach a higher security level. These rounds 105, 110 are identical except that the key in each round 105, 110 is different from one another. Each round consists of two elementary blocks 80, 50. The first block is the nonlinear transform block 80 of FIG. 5A, though it is preferred that the transform block be implemented by its polyphase representation form. The second block 50 is the transform block 50 of FIG. 3A that may also be implemented by its polyphase representation 55 illustrated in FIG. 3B. According to one preferred embodiment of the present invention, each elementary block consists of the polyphase filter $e_{00}(n)$ of length 15 (for the second key generation method this length is 8) that operates over the finite field GF(256). As discussed in detail above, the polyphase filter coefficients are the key unknown to a hacker attempting to intercept and decrypt an cyphertext transmitted from the wavelet encryption system 100 to the wavelet decryption system 120. Because the polyphase filter is symmetric, the actual number for the key comprises eight coefficients in GF(256), or equivalently 64 bits. Therefore, each round 105, 110 of the wavelet encryption system 100 has key size of 128 bits. Additionally, the effective key size of the two-round wavelet is 128 because the key for the second round is obtained by the same 128 bits key of the first round by some permutation of the coefficients, as is known to those of ordinary skill in the art.

FIG. 6B shows the wavelet decryption system 120 which consists of two rounds 115, 118 as in the wavelet encryption system 100. Each round 115, 118 inverts the operation of the corresponding round 110, 105 of the encryption system 100. Similar to the transform blocks of the encryption, the inverse transform blocks of the decryption system are preferably implemented by their polyphase form. As described above, systems of the present invention work in both stream cipher and block cipher modes via a simple change of the linear convolution to a cyclic convolution, respectively. Based on the filter length that is used, in the block cipher case, the length of the cyphertext block should be 30 symbols in GF(256), or equivalently 240 bits. The number of additions and multiplications required by the convolution operation of the encryption and decryption process may be significantly reduced by using finite-field FFT or an appropriate bilinear cyclic convolution transform.

For higher security, it may be assumed that each time the system of the present invention initiates the encryption process, the initial states of the polyphase filters in the nonlinear transform block of the first round are chosen randomly. Because these initial random states are not used by the receiving device, the first block of the cyphertext will not be decryptable by the receiver. Therefore, in the block cipher mode, the first 240 bits will not be correctly inverted by the receiver (because the plaintext is added to the random initial state). Similarly, in the stream cipher mode, ciphertext of a length equal to the key size (128 bits) will not be decodable by the receiver if a random initial state is used for the polyphase filters of the nonlinear transform block in the first round.

As illustrated by the optional nonlinear operation illustrated in dashed lines in FIGS. 6A and 6B, to enhance the security of the cryptosystem an optional invertible nonlinear operation may also be used between the nonlinear transform block and the linear transform block at each round of encryption and decryption. As an illustrative example, $(a)^{128}$ may be used as a nonlinear operator, where (a) is the input to the operator. This operation in invertible in the decryption rounds 115, 118 of FIG. 6B because $(a^{128})^2 = a$. Therefore, continuing with this illustrative example, $(a)^2$ could be used in between the blocks in the decryption rounds 115, 118 to reverse the effect of the nonlinear operation. As a result, nonlinearity can further enhance the security of the system with little additional operations or expense.

For efficient implementation, the convolution operation may be performed for both block cipher and stream cipher modes in a cyclic fashion. This exploits fast (or less complex) algorithms to carry out the convolution. However, some parts of the wavelet encryption system contain feedback which makes the cyclic convolution difficult to perform. To resolve this difficulty, the feedback system may be implemented in a block by block form. In other words, the output of the feedback system may be buffered for every block of size 240 bits. This block of the feedback output may be added to the next message block that will be encrypted. In other words, the present feedback output does not affect the encryption of the current message. Instead, the current message is added to the feedback output (240 bits) resulting from the encryption of the previous message block. This way the cyclic convolution can be carried out naturally for the current data block that is under encryption process without the interference of the feedback output.

Figure 7A:
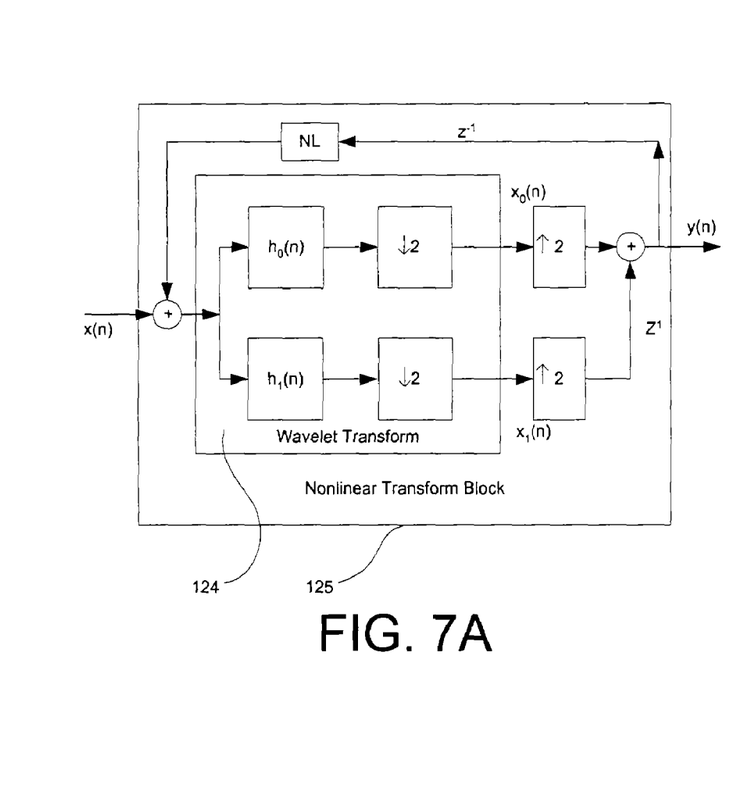
FIG. 7A shows the nonlinear transform block constructed by exchanging the rule of the wavelet transform with that of the inverse wavelet in FIG. 5A, according to one aspect of the present invention.
Figure 7B:
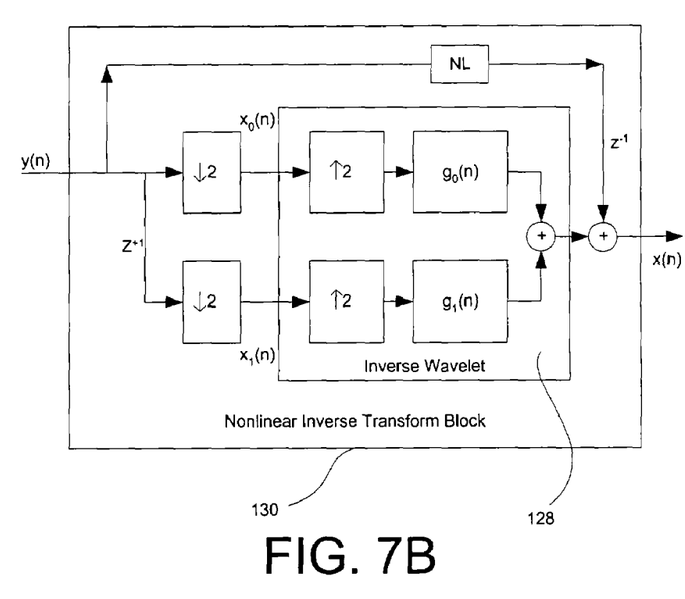
FIG. 7B shows the inverse transform blocks constructed by exchanging the rule of the wavelet transform with that of the inverse wavelet in FIG. 5B, according to one aspect of the present invention.

It should be appreciated that although in the above embodiments the inverse wavelet transform is used as the basic operation in the wavelet encryption system 13 and the wavelet transform is used as the basic operation in the wavelet decryption system 26, the role of the wavelet transform and the inverse wavelet may be exchanged. In other words, as is shown in FIGS. 7A and 7B, the wavelet transform 124 in the basic nonlinear transform block 125 may be used to implement the wavelet encryption system 13 and the inverse wavelet transform 128 in the basic inverse transform block 130 may be used to implement the wavelet decryption system 26. Therefore, it will be appreciated that FIGS. 7A and 7B, respectively, show the structure of the nonlinear transform and inverse transform blocks when the roles of the wavelet and the inverse wavelet are reversed from the preferred embodiment previously considered herein. It should be appreciated that a similar change may be applied for the linear transform and inverse transform blocks used in the wavelet encryption system and wavelet decryption system shown in FIGS. 6A and 6B.

Figure 8:
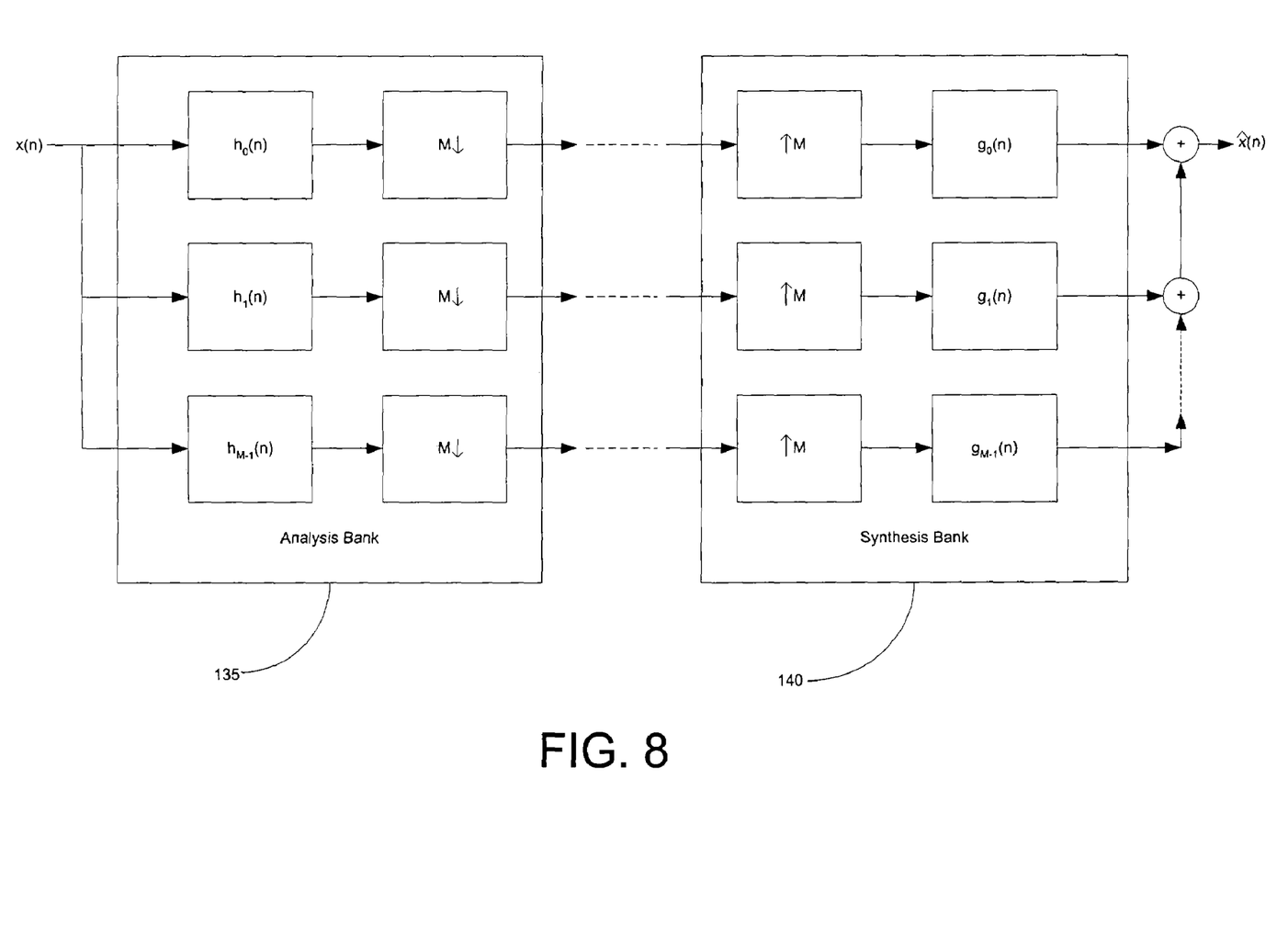
FIG. 8 shows an M-channel maximally decimated filter bank, according to one embodiment of the present invention.

Throughout the present description the invention has been described with respect to two-band wavelet (i.e., two-channel filter bank) over finite fields to construct the wavelet encryption and wavelet decryption systems. However, as illustrated in FIG. 8, multi-band wavelets (i.e., multi-channel filter banks), which are the generalization of the two-band wavelets, may also be utilized to implement the wavelet encryption and decryption systems of the present invention. More specifically, multi-channel filter banks forming an analysis bank 135 and a synthesis bank 140 are illustrated in FIG. 8. Therefore, cryptosystems of the present invention may also be constructed by multi-band wavelets (i.e., multi-channel filter banks). To further explain the implementation of this embodiment, the inverse wavelet (synthesis bank) of the two-band system shown in FIG. 5A may be replaced with the inverse wavelet (synthesis bank) of the M-band system shown in FIG. 8. Similarly, the wavelet transform (analysis bank) of the two-band system shown in FIG. 5B may be replaced with the wavelet transform (analysis bank) of the M-band system. Additionally, the message sequence x(n) may be split into M subsequences as opposed to only two subsequences in FIG. 5. In other words, all the upsamples and downsamples by factor of two are replaced by the factor M. It will be appreciated that similar modifications are required to construct the linear transform and inverse transform blocks if M-channel filter banks are used instead of the two-channel filter banks considered herein.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the present invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for encoding and decoding data for secure transmission, comprising:
   an encryption system, wherein said encryption system includes at least one non-linear device, and is operable to receive plaintext and to encrypt said plaintext at least in part by performing an inverse wavelet transformation over a finite field on said plaintext to produce cyphertext; and
   a decryption system in communication with said encryption system, wherein said decryption system is operable to receive said cyphertext and to reproduce said plaintext by performing a wavelet transformation over a finite field on said cyphertext.

2. The system of claim 1, wherein said cyphertext comprises either block cyphertext or stream cyphertext.

3. The system of claim 1, wherein said encryption system includes at least one filter for performing an inverse wavelet transformation over a finite field on said plaintext to produce said cyphertext.

4. The system of claim 3, wherein said at least one filter comprises a digital filter, and wherein said digital filter is configured to exhibit a predefined transfer function defined by a set of predefined filter coefficients, said filter coefficients defined to perform said mathematical inverse wavelet transformation on said plaintext.

5. The system of claim 4, wherein said filter coefficients are based at least in part on a secret key.

6. The system of claim 1, wherein said decryption system includes at least one filter for performing a wavelet transformation over a finite field on said cyphertext to produce said plaintext.

7. The system of claim 6, wherein said at least one filter comprises a digital filter, and wherein said digital filter is configured to exhibit a predefined transfer function defined by a set of predefined filter coefficients, said filter coefficients defined to perform said mathematical wavelet transformation on said cyphertext.

8. The system of claim 1, wherein said encryption system includes at least one feedback loop.

9. The system of claim 1, wherein said decryption system includes at least one feedforward loop.

10. The system of claim 1, wherein said decryption system includes at least one non-linear device.

11. The system of claim 1, wherein said encryption system and said decryption system are operable to encode and decode data used in at least one operation chosen from the group of operations consisting of authentication, hashing, and signature verification.

12. The system of claim 1, wherein said encryption system is further operable to perform a second inverse wavelet transformation over a finite field to produce cyphertext, and wherein said decryption system is further operable to perform a second wavelet transformation over a finite field to reproduce said plaintext.

13. The system of claim 12, further comprising at least one non-linear device.

14. A system for encoding and decoding data for secure transmission, comprising:
   an encryption system, wherein said encryption system includes at least one non-linear device and is operable to receive plaintext and to encrypt said plaintext at least in part by performing a wavelet transformation over a finite field on said plaintext to produce cyphertext; and
   a decryption system in communication with said encryption system, wherein said decryption system is operable to receive said cyphertext and to reproduce said plaintext by performing an inverse wavelet transformation over a finite field on said cyphertext.

15. The system of claim 14, wherein said cyphertext comprises either block cyphertext or stream cyphertext.

16. The system of claim 14, wherein said encryption system includes at least one filter for performing a wavelet transformation over a finite field on said plaintext to produce said cyphertext.

17. The system of claim 16, wherein said at least one filter comprises a digital filter, and wherein said digital filter is configured to exhibit a predefined transfer function defined by a set of predefined filter coefficients, said filter coefficients defined to perform said mathematical wavelet transformation on said plaintext.

18. The system of claim 17, wherein said filter coefficients are based at least in part on a secret key.

19. The system of claim 14, wherein said decryption system includes at least one filter for performing an inverse wavelet transformation over a finite field on said cyphertext to produce said plaintext.

20. The system of claim 19, wherein said at least one filter comprises a digital filter, and wherein said digital filter is configured to exhibit a predefined transfer function defined by a set of predefined filter coefficients, said filter coefficients defined to perform said mathematical inverse wavelet transformation on said cyphertext.

21. The system of claim 14, wherein said encryption system includes at least one feedback loop.

22. The system of claim 14, wherein said decryption system includes at least one feedforward loop.

23. The system of claim 14, wherein said decryption system includes at least one non-linear device.

24. The system of claim 14, wherein said encryption system and said decryption system are operable to encoding and decoding data used in at least one operation chosen from the group of operations consisting of authentication, hashing, and signature verification.

25. The system of claim 14, wherein said encryption system is further operable to perform a second wavelet transformation over a finite field to produce cyphertext, and wherein said decryption system is further operable to perform a second inverse wavelet transformation over a finite field to reproduce said plaintext.

26. An encryption system for enabling encryption of an plaintext, comprising means for receiving an plaintext and means for encrypting said plaintext at least in part by utilizing at least one non-linear device and performing a mathematical inverse wavelet transformation over a finite field on said plaintext to produce cyphertext.

27. The encryption system of claim 26, wherein said cyphertext is selected from the group consisting of block data or stream data.

28. The encryption system of claim 26, wherein said means for encrypting said plaintext at least in part by performing a mathematical inverse wavelet transformation is a filter.

29. The encryption system of claim 26, wherein said means for encrypting said plaintext at least in part by performing a mathematical inverse wavelet transformation is a digital filter, said digital filter configured to exhibit a predefined transfer function defined by a set of predefined filter coefficients, said filter coefficients being defined to perform said mathematical inverse wavelet transformation on said plaintext.

30. The encryption system of claim 26, wherein said means for encrypting said plaintext at least in part by performing a mathematical inverse wavelet transformation is an analog filter, said analog filter configured to exhibit a predefined transfer function defined by a set of predefined filter parameters, said predefined filter parameters defining said mathematical inverse wavelet transformation.

31. The encryption system of claim 26, further comprising a means for performing a mathematical wavelet transformation over said finite field on said plaintext, in addition to said mathematical inverse wavelet transformation, in order to produce said cyphertext.

32. The encryption system of claim 26, further comprising a means for communicating said cyphertext over a wireless communication medium.

33. An encryption system for enabling encryption of an plaintext, comprising means for receiving an plaintext and means for encrypting said plaintext at least in part by utilizing at least one non-linear device and performing a mathematical wavelet transformation over a finite field on said plaintext to produce cyphertext.

34. A method for transmitting encrypting data, comprising the steps of:
   receiving plaintext;
   encrypting said plaintext at least in part by utilizing at least one non-linear device and performing a mathematical wavelet transformation over a finite field on said plaintext to produce cyphertext; and
   transmitting said cyphertext.

35. The method of claim 34, wherein the step of performing a mathematical wavelet transformation comprises the step of performing a mathematical inverse wavelet transformation.

36. The method of claim 34, further comprising the steps of:

receiving said plaintext at a digital filter; and implementing said performing step by causing said digital filter to exhibit a predefined transfer function defined by a set of predefined filter coefficients.

37. The method of claim 34, further comprising the steps of:

receiving said plaintext at an analog filter; and implementing said performing step by causing said analog filter to exhibit a predefined transfer function defined by a set of pre defined filter parameters, said predefined filter parameters defining said mathematical inverse wavelet transformation.

38. The method of claim 34, further comprising the step of performing a mathematical wavelet transformation over said finite field on said plaintext, in addition to said mathematical inverse wavelet transformation, to produce said cyphertext.

39. A decryption system comprising a means for receiving cyphertext and for decrypting said cyphertext at least in part by utilizing at least one non-linear device and performing a mathematical wavelet transformation over a finite field on said cyphertext to produce an plaintext.

40. The decryption system of claim 39, wherein said means is at least one filter.

41. The decryption system of claim 39, wherein said decoder includes means operable to perform a mathematical inverse wavelet transformation in addition to performing said mathematical wavelet transformation.

42. The decryption system of claim 39, further comprising a means for deriving a plurality of wavelet coefficients based upon said cyphertext to produce said plaintext.

43. The decryption system of claim 39, wherein said means is a digital filter, said digital filter configured to exhibit a predefined transfer function defined by a set of predefined filter coefficients, said filter coefficients being defined to perform said mathematical wavelet transformation on said cyphertext.

44. The decryption system of claim 39, wherein said means is an analog filter, said analog filter configured to exhibit a predefined transfer function defined by a set of predefined filter parameters, said predefined filter parameters defining said mathematical wavelet transformation.

45. The decryption system of claim 39, further comprising a means for receiving said cyphertext from a wireless communications medium.

46. A method for encoding and decoding data for secure transmission, comprising:

receiving plaintext at an encryption system;

encrypting said plaintext at least in part by utilizing at least one non-linear device and performing an inverse wavelet transformation over a finite field on said plaintext to produce cyphertext;

receiving said cyphertext at a decryption system in communication with said encryption system; and reproducing said plaintext at least in part by performing a wavelet transformation over a finite field on said cyphertext.

47. The method of claim 46, wherein said cyphertext comprises either block cyphertext or stream cyphertext.

48. The method of claim 46, further comprising performing an inverse wavelet transformation over a finite field on said plaintext to produce cyphertext using at least one.

49. The method of claim 48, wherein said at least one filter exhibits a predefined transfer function defined by a set of predefined filter coefficients, and wherein said filter coefficients are used to perform said mathematical inverse wavelet transformation on said plaintext.

50. The method of claim 49, wherein said filter coefficients are based at least in pad on a secret key.

51. The method of claim 46, wherein the step of reproducing said plaintext by performing a wavelet transformation over a finite field on said cyphertext comprises reproducing said plaintext using at least one filter for performing a wavelet transformation over a finite field on said cyphertext to produce said plaintext.

52. The method of claim 46, wherein said step of performing an inverse wavelet transformation includes performing an inverse wavelet transformation using at least one feedback loop.

53. The method of claim 46, wherein said step of performing a wavelet transformation includes performing a wavelet transformation using at least one feedforward loop.

54. The method of claim 46, wherein said step of performing a wavelet transformation includes performing a wavelet transformation using at least one nonlinear device.

* * * * *